(12) United States Patent
Nanda et al.

(10) Patent No.: US 8,886,229 B2
(45) Date of Patent: Nov. 11, 2014

(54) SENSOR NETWORKS BASED ON WIRELESS DEVICES

(75) Inventors: Sanjiv Nanda, Ramona, CA (US); Avneesh Agrawal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 950 days.

(21) Appl. No.: 11/862,051

(22) Filed: Sep. 26, 2007

(65) Prior Publication Data

US 2008/0076450 A1 Mar. 27, 2008

Related U.S. Application Data

(60) Provisional application No. 60/847,433, filed on Sep. 26, 2006.

(51) Int. Cl.
*H04W 24/00* (2009.01)
*G01S 5/00* (2006.01)
*G01D 21/00* (2006.01)
*H04W 16/14* (2009.01)
*H04W 24/10* (2009.01)
*H04W 84/18* (2009.01)

(52) U.S. Cl.
CPC .............. *G01D 21/00* (2013.01); *G01S 5/0009* (2013.01); *H04W 16/14* (2013.01); *H04W 24/10* (2013.01); *H04W 84/18* (2013.01); *H04W 24/00* (2013.01)
USPC .................. 455/456.6; 455/404.2; 455/414.1; 455/418; 455/439; 455/440; 455/456.1; 455/456.2; 455/456.3; 455/456.5; 455/457; 370/310.2; 370/331; 370/338

(58) Field of Classification Search
USPC .................... 455/404.2, 414.1, 418, 439, 440, 455/456.1–457; 370/310, 310.2, 331, 338
See application file for complete search history.

(56) References Cited

U.S. PATENT DOCUMENTS 5,463,673 A * 10/1995 Herscovici .................... 455/446
5,734,981 A * 3/1998 Kennedy et al. .............. 455/445

(Continued)

FOREIGN PATENT DOCUMENTS

CN 1444744 A 9/2003
CN 1691719 A 11/2005

(Continued)

OTHER PUBLICATIONS

Partial International Search Report—PCT/US2007/079597, International Searching Authority—European Patent Office—Mar. 17, 2008.

(Continued)

*Primary Examiner* — Steve D Agosta

(57) ABSTRACT

Techniques for using wireless devices to implement sensor networks are described. For cognitive radio, a wireless device obtains measurements for a first system (e.g., a broadcast system) with which the wireless device is not in communication. The wireless device sends the measurements and associated location information and/or timestamps via a second system (e.g., a cellular system). A server receives measurements from a number of wireless devices and determines the coverage of the first system based on the measurements. For other applications, a wireless device obtains sensor information from at least one sensor at the wireless device and sends the sensor information and associated location information and/or timestamps via a wireless system. A server receives the sensor information and associated information from a number of wireless devices, aggregates the sensor information, and constructs a map. The wireless device may develop a user profile based on the sensor information and associated information.

4 Claims, 6 Drawing Sheets

(56) References Cited

U.S. PATENT DOCUMENTS

| | | | |
|---|---|---|---|
| 5,917,449 A * | 6/1999 | Sanderford et al. | 342/457 |
| 6,035,202 A * | 3/2000 | Camp, Jr. | 455/456.1 |
| 6,295,449 B1 * | 9/2001 | Westerlage et al. | 455/422.1 |
| 6,295,454 B1 * | 9/2001 | Havinis et al. | 455/456.3 |
| 6,449,485 B1 * | 9/2002 | Anzil | 455/456.1 |
| 6,560,442 B1 * | 5/2003 | Yost et al. | 455/423 |
| 7,113,753 B2 * | 9/2006 | Cotanis | 455/115.1 |
| 7,120,431 B1 * | 10/2006 | Huo et al. | 455/423 |
| 7,123,910 B2 * | 10/2006 | Lucidarme et al. | 455/434 |
| 7,133,663 B2 | 11/2006 | Fano et al. | |
| 7,209,468 B2 | 4/2007 | Twitchell, Jr. | |
| 2002/0042268 A1 * | 4/2002 | Cotanis | 455/423 |
| 2002/0111172 A1 | 8/2002 | DeWolf et al. | |
| 2003/0119530 A1 * | 6/2003 | Rankin | 455/456 |
| 2003/0197642 A1 * | 10/2003 | Smith | 342/360 |
| 2004/0147262 A1 | 7/2004 | Lescuyer et al. | |
| 2006/0029198 A1 | 2/2006 | Dorneich et al. | |
| 2007/0026854 A1 * | 2/2007 | Nath et al. | 455/423 |
| 2007/0253394 A1 | 11/2007 | Horiguchi et al. | |

FOREIGN PATENT DOCUMENTS

| | | |
|---|---|---|
| CN | 1745702 A | 3/2006 |
| EP | 1215928 | 6/2002 |
| EP | 1257141 | 11/2002 |
| GB | 2402841 | 12/2004 |
| JP | 11118855 A | 4/1999 |
| JP | 2002351927 A | 12/2002 |
| JP | 2004180204 A | 6/2004 |
| JP | 2004356873 A | 12/2004 |
| JP | 2007300419 A | 11/2007 |
| JP | 2008508790 A | 3/2008 |
| RU | 99120176 | 9/2002 |
| TW | 333728 | 6/1998 |
| TW | 200404444 | 3/2004 |
| TW | 200614735 | 5/2006 |
| TW | I255118 | 5/2006 |
| WO | WO9934575 A1 | 7/1999 |
| WO | 0210942 | 2/2002 |
| WO | 0211455 | 2/2002 |
| WO | 03100647 | 12/2003 |
| WO | WO2004100478 A2 | 11/2004 |
| WO | WO2005069579 | 7/2005 |
| WO | 2005094309 A2 | 10/2005 |
| WO | 2006020405 | 2/2006 |
| WO | WO-2006022903 A2 | 3/2006 |

OTHER PUBLICATIONS

International Search Report—PCT/US2007/079597, International Searching Authority—European Patent Office—May 8, 2008.

Written Opinion—PCT/US2007/079597, International Searching Authority—European Patent Office—May 8, 2008.

Dorot, V., et al., Tolkovy Slovar Sovremennoy Kompjuternoy Leksiki (The Explanatory Dictionary for Modern Computer Vocabulary), 2nd edition, BHV-Petersburg Publishers, Saint-Petersburg, 2001, p. 339.

"Golubi s mobil'nikami proveryajut vozdukh" (Doves provided with mobile phones check air), published on Feb. 3, 2006, Sotaweek, St. Petersburg, Russian Federation.

Taiwanese Search report—096135838—TIPO—Jul. 29, 2010.

C. R. Stevenson, et al., Functional Requirements for the 802.22 WRAN Standards, IEEE 802.22-04/0004r46, Sep. 2005.

European Search Report—EP09155730, Search Authority—Munich Patent Office, May 29, 2009.

IEEE 802.16 IEEE Standard for Local and metropolitan area networks, Part 16: Air Interface for Fixed Broadband Wireless Access Systems, IEEE Std. 802.16-2004 (Revision of IEEE Std. 802.16-2001), Oct. 1, 2004.

Taiwan Search Report—TW096135838—TIPO—Sep. 19, 2011.

Cordeiro C et al., IEEE 802.22: the first worldwide wireless standard based on cognitive radios, First IEEE International Symposium on, vol., No., pp. 328-337, Nov. 8-11 Doi : 10.1109/DYSPAN.2005.1542649. URL:http://ieeexplore.ieee.org/stamp/stamp.jsp?tp=&arnumber=1542649&isnumber=32916.

\* cited by examiner

SENSOR NETWORKS BASED ON WIRELESS DEVICES

The present application claims priority to provisional U.S. Application Ser. No. 60/847,433, entitled "MOBILE STATION SENSOR NETWORKS," filed Sep. 26, 2006, assigned to the assignee hereof and incorporated herein by reference.

BACKGROUND

I. Field

The present disclosure relates generally to communication, and more specifically to techniques for using wireless devices.

II. Background

Wireless communication networks are widely deployed to provide various communication services such as voice, video, packet data, messaging, broadcast, etc. These wireless networks may be multiple-access networks capable of supporting communication for multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless network may include many base stations that can support communication for many wireless devices, e.g., cellular phones. Conventionally, wireless devices are used primarily for radio communication and are often carried everywhere by users. Recently, wireless devices have been designed with additional features such as cameras for taking pictures and capturing videos, positioning capabilities for determining the location of users, etc. These additional features provide more capabilities and enable greater use of the wireless devices by the users for communication as well as other functions.

SUMMARY

Techniques for using wireless devices to implement sensor networks are described herein. A sensor network is a network that can collect information from sensor devices located throughout the network and can process and present the collected information for a particular application. Wireless devices may be equipped with various types of sensors and may be efficiently used as the sensor devices.

In an aspect, wireless devices may be used in a sensor network for an application commonly known as cognitive radio. In one design, a wireless device may obtain measurements for a first communication system (e.g., a broadcast system) with which the wireless device is not in communication. Location information and/or a timestamp may also be determined for each measurement. The wireless device may send the measurements and the associated location information and/or timestamps via a second communication system (e.g., a cellular system). The measurements may be signal strength measurements for a frequency band used by the first system and not used by the second system. A sensor network server may receive measurements from a number of wireless devices and may determine the coverage of the first system based on these measurements.

In another aspect, wireless devices may be used in sensor networks for a variety of applications involving aggregation of information from a large number of wireless devices. In one design, a wireless device may obtain sensor information from at least one sensor at the wireless device. Location information and/or timestamps may also be obtained and associated with the sensor information. The wireless device may send the sensor information and the associated location information and/or timestamps via a wireless communication system. A sensor network server may receive the sensor information and associated information from a number of wireless devices, aggregate the sensor information, and construct a coverage map, a population density map, a traffic prediction map, etc., based on the aggregated sensor information.

In yet another aspect, a wireless device may develop a user profile based on sensor information and associated location information and/or timestamps. Certain operation of the wireless device may be controlled based on the user profile.

Various aspects and features of the disclosure are described in further detail below.

DETAILED DESCRIPTION

Figure 1:
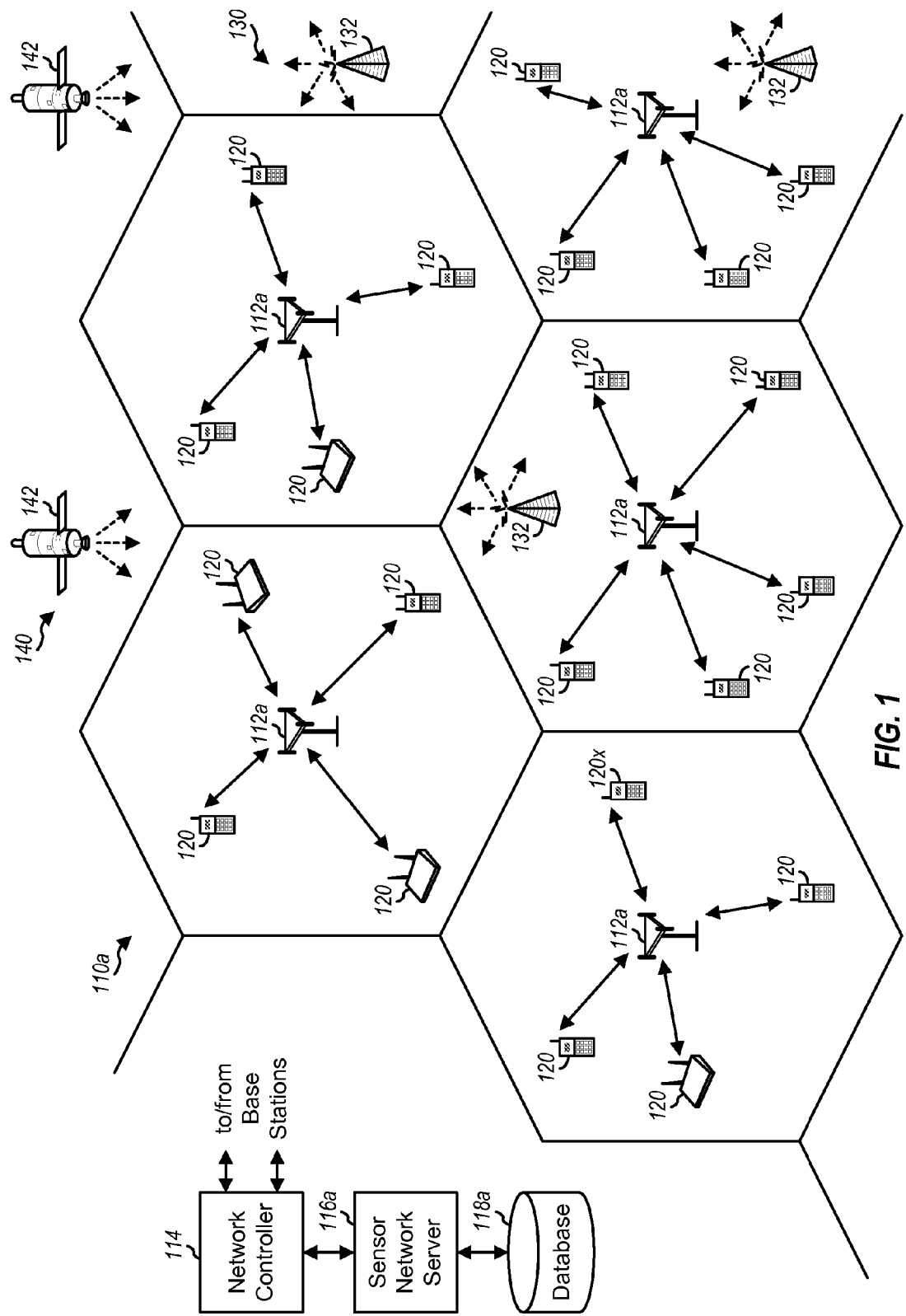
FIGS. 1 and 2 show two wireless communication networks.

Sensor networks may be used to address a number of interesting data collection and utilization scenarios. Some example applications for sensor networks include spectrum usage detection (e.g., for cognitive radio), traffic prediction and avoidance, weather prediction, radiation detection (e.g., for homeland security), etc.

In one possible implementation, a sensor network may have a large number of special-purpose sensor devices that may be universally deployed in a given geographic region. Each sensor device may include a sensor to measure a particular physical phenomenon such as, e.g., radio frequency (RF) usage in a particular frequency band, temperature, motion, radiation, etc. A sensor may comprise a detector, measurement circuitry, etc. Each sensor device may also include communication and/or networking capability. The sensor devices may make measurements with the sensors, collect measurement data, self-organize into a low-power multi-hop mesh network, and employ a communication protocol to forward the measurement data and other information (e.g., location and/or time information) to a designated server. The server may process and aggregate the data obtained from all sensor devices. The terms "data", "information", and "measurements" are often used interchangeably.

The sensor devices should have the following properties:
Ubiquitous deployment in a geographic region,
Low cost, e.g., throw-away,
Communication capability, and
Low battery consumption and long battery life.

Including throw-away low-power communication capability in a sensor device has proven to be a hard problem to solve.

Deployment of many (e.g., millions of) disposable sensor devices with communication capability is unlikely to be a cost-effective solution to address most consumer applications.

In an aspect, a sensor network may be implemented with wireless devices that are widely used for wireless communication with wireless communication networks, e.g., cellular networks. A sensor network implemented with wireless devices may also be referred to as a mobile station sensor network. A wireless device may also be referred to as a mobile station, a user equipment, a terminal, a station, a subscriber unit, a subscriber station, etc. A wireless device may be a cellular phone, a smart phone, a personal digital assistant (PDA), a wireless modem, a handheld communication device, a handheld computing device, a laptop computer, a satellite radio or positioning receiver, a cordless phone, etc. The wireless devices may be able to satisfy the requirements of a sensor network in a more effective and less expensive manner than special-purpose sensor devices for the following reasons:

Wireless devices are ubiquitous and present wherever people are present,
Wireless devices already have powerful built-in communication capability,
Wireless devices and wireless networks have powerful and efficient data networking technology,
Wireless device batteries are frequently recharged,
Wireless devices may be equipped with a variety of sensors, and
Wireless devices may have positioning capabilities.

A large number (e.g., millions) of wireless devices are currently in use, and more wireless devices are continually placed in service. Wireless devices are typically mobile and thus, over time, can provide more extensive coverage of a region as compared to statically deployed sensor devices. Wireless devices have built-in communication capability, which eliminates the requirement of an inexpensive throwaway communication unit. Wireless devices and wireless networks have extensive data networking technology, which provides flexibility for data gathering and transfer and eliminates the need to design a complicated multi-hop mesh networking architecture for low-power nodes with short-hop communication capability and long sleep cycles. Wireless devices have batteries that are periodically recharged, which eliminates the requirement of long battery life, e.g., of several years. Wireless devices may already be equipped with various sensors such as, e.g., microphones, cameras, antennas and radio receivers, etc., which may be utilized for data gathering. Additional types of sensors may be added to wireless devices to support a variety of applications. Wireless devices may also have satellite-based and/or network-based positioning capabilities. These various capabilities of wireless devices may be exploited to address a large number of applications for sensor networks.

FIG. 1 shows a wireless communication network 110a capable of supporting communication for many wireless devices 120 and facilitating transfer of data for sensor networks. The terms "network" and "system" are often used interchangeably. Wireless network 110a may be a wireless wide area network (WWAN) that can provide communication coverage for a large geographic area such as, e.g., a city, a state, or an entire country. Wireless network 110a may be a cellular network such as a CDMA, TDMA, FDMA, OFDMA or SC-FDMA network. A CDMA network may implement a radio technology such as cdma2000, Universal Terrestrial Radio Access (UTRA), etc. cdma2000 covers IS-2000, IS-95 and IS-856 standards. UTRA includes Wideband-CDMA (W-CDMA) and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.16 (WiMAX), IEEE 802.20, Flash-OFDM®, etc. These various networks, radio technologies, and standards are known in the art. The terms "radio technology", "air interface", and "communication protocol" are often used interchangeably.

Wireless network 110a may include many base stations 112a. A base station may be a fixed station that communicates with the wireless devices and may also be referred to as a Node B, an evolved Node B (eNB), an access point, etc. Each base station 112a provides communication coverage for a particular geographic area. The coverage area of a base station may be partitioned into smaller areas, e.g., three smaller areas. The term "sector" or "cell" can refer to the smallest unit of coverage of a base station and/or a base station subsystem serving this coverage area, depending on the context in which the term is used.

A network controller 114 may couple to base stations 112a and provide coordination and control for the base stations. Network controller 114 may perform radio resource management, mobility management functions, and other functions to support communication for wireless devices 120. Network controller 114 may be a single network entity or a collection of network entities. A sensor network server 116a may couple to network controller 114, receive sensor information and/or measurements from wireless devices 120, and process the sensor information and/or measurements as described below. A storage unit 118a may store a centralized database for server 116a.

A broadcast system 130 may be deployed over all or part of the coverage area of wireless network 110a. Broadcast system 130 may be a television broadcast system, a radio broadcast system, a digital broadcast system, etc. For example, broadcast system 130 may be a MediaFLO system, a Digital Video Broadcasting for Handhelds (DVB-H) system, an Integrated Services Digital Broadcasting for Terrestrial Television Broadcasting (ISDB-T) system, etc.

A satellite positioning system (SPS) 140 may cover all or part of the coverage area of wireless network 110a. SPS 140 may be the United States Global Positioning System (GPS), the Russian GLONASS system, the European Galileo system, or some other satellite positioning system. GPS is a constellation of 24 well-spaced satellites plus some spare satellites that orbit the earth. Each GPS satellite transmits an encoded signal that allows GPS receivers on earth to accurately estimate their positions based on measurements for a sufficient number of satellites (typically four) and the known locations of these satellites.

Wireless devices 120 may be dispersed throughout wireless network 110a, and each wireless device may be stationary or mobile. A wireless device may communicate two-way with base stations 112a in wireless network 110a. A wireless device may also receive signals from broadcast stations 132 in broadcast system 130 and/or satellites 142 in SPS 140 at any given moment.

Figure 2:
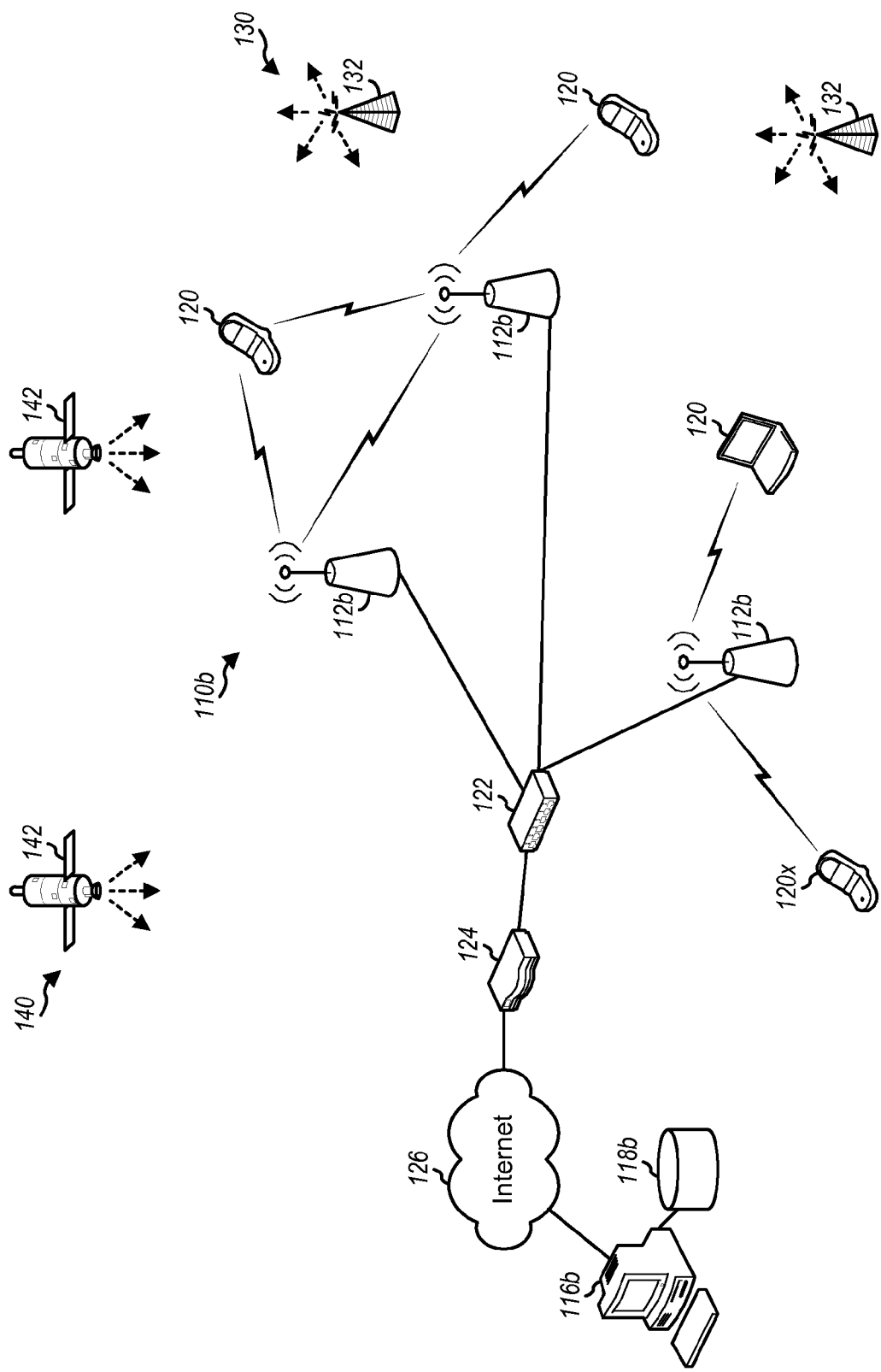

FIG. 2 shows a wireless communication network 110b also capable of supporting communication for many wireless devices 120 and facilitating transfer of data for sensor networks. Wireless network 110b may be a local wide area network (WLAN) that can provide communication coverage for a medium geographic area such as, e.g., a building, an office, a mall, a campus, etc. Wireless network 110b may implement a radio technology such as any in the IEEE 802.11 family of standards (e.g., 802.11a, 802.11b, 802.11g or 802.11n), Hiperlan, etc. IEEE 802.11 is commonly referred to as Wi-Fi.

Wireless network 110b may include any number of access points 112b. An access point is a station that can provide access to distribution services via the wireless medium for stations associated with that access point. Access points 112b may also provide an interface between wireless network 110b and a wired network such as a local area network (LAN) or a wide area network (WAN). Wireless devices 120 are stations that can communicate with access points 112b. The stations (e.g., access points 112b or wireless devices 120) may also communicate with one another via peer-to-peer communication.

Access points 112b may couple to an Ethernet hub or switch 122, which may further couple to a router 124 that can exchange data packets with a WAN 126 such as the Internet. A sensor network server 116b may couple to WAN 126 (as shown in FIG. 2) or may couple to hub/switch 122 or router 124 (not shown in FIG. 2). Server 116b may receive sensor information and/or measurements from wireless devices 120 and may process the sensor information and/or measurements as described below. A storage unit 118b may store a centralized database for server 116b.

In general, a wireless device may be capable of communicating with any number of networks and systems and any radio technology. A wireless device may support communication with a WWAN (e.g., a cellular network), a WLAN (e.g., an IEEE 802.11 network), a wireless personal area network (WPAN), etc. A WPAN may implement Bluetooth, which is a short-range radio technology adopted as IEEE 802.15 standard.

In an aspect, wireless devices may be used in a sensor network for an application commonly known as cognitive radio. Cognitive radio refers to the use of a given frequency spectrum when the spectrum is not used by a primary licensee. The spectrum may be granted to the primary licensee for a particular geographic area with the provision that the spectrum can be used by other devices when not used by the primary licensee. The primary licensee may use all or a portion of the spectrum in all or part of the geographic area. Other devices may use the unused portion of the spectrum in any area not covered by the primary licensee.

In the example shown in FIG. 1, the primary licensee may be a broadcast television licensee that operates broadcast system 130. The primary licensee may have a license for a spectrum within a particular frequency range in a particular geographic area. The frequency range may be a range from 400 to 700 MHz, a very high frequency (VHF) range from 30 to 300 MHz, an ultra high frequency (UHF) range from 300 MHz to 3 GHz, etc. The primary licensee may have broadcast stations operating on the licensed spectrum in only part of the licensed geographic area.

In one design, a wireless device 120x may be equipped with a spectrum usage sensor for a designated frequency range of interest, which may cover one or more frequency bands such as broadcast television bands. Wireless device 120x may be representative of each of wireless devices 120 in FIGS. 1 and 2. Wireless device 120x may periodically make measurements of signals received in different frequency bands. The spectrum usage sensor may comprise a signal strength detector that can measure the signal strength or received power in each frequency band. Alternatively, the spectrum usage sensor may comprise a demodulator that can demodulate the received signals in each frequency band and determine whether the signals can be reliably demodulated.

Wireless device 120x may also determine its location and a timestamp for each spectrum usage measurement or each set of measurements. Wireless device 120x may obtain an accurate location estimate with a positioning method such as GPS, assisted GPS (A-GPS), Advanced Forward Link Trilateration (A-FLT), Enhanced Observed Time Difference (E-OTD), Observed Time Difference Of Arrival (OTDOA), etc. Alternatively, wireless device 120x may obtain a coarse location estimate based on a positioning method such as Cell ID or Enhanced Cell ID, which may provide a designated location (e.g., the cell center) as the location estimate for wireless device 120x. These various positioning methods are known in the art. The required location accuracy may be dependent on the application. A coarse location estimate may be sufficient when information from a large number of wireless devices can be aggregated.

Wireless device 120x may send the spectrum usage measurements and the associated information to a sensor network server via a wireless network, e.g., to server 116a via wireless network 110a in FIG. 1 or to server 116b via wireless network 110b in FIG. 2. In general, the associated information may comprise location information and/or timestamps. The server may be a central data collection entity that can receive and process measurements from different wireless devices. To minimize battery usage and communication overhead, wireless device 120x may store the measurements locally at the wireless device until it establishes a voice call or a data connection for a reason other than to send the measurements. Wireless device 120x may then send the measurements to the server, e.g., as background data traffic.

The server may receive spectrum usage measurements from many (e.g., thousands or millions of) wireless devices located throughout the wireless network. Over a period of time, due to the large number of wireless devices and the mobility of users, the server may be able to obtain spectrum usage measurements for the designated frequency range at just about every location occupied by receivers of the primary licensee. The server may process the measurements received from the wireless devices and aggregate the data obtained from the measurements. The server may be able to obtain a reliable database of spectrum usage by the primary licensee. The database may provide the spectrum usage by time, location, and frequency band. The server may also generate spectrum usage maps for different frequency bands. The map for each frequency band may indicate the coverage area of the primary licensee for that frequency band.

The spectrum usage database may be used to support operation on the licensed spectrum in areas not covered by the primary licensee. Wireless devices with spectrum agile transceivers may be able to use the portions of the spectrum not used by the primary licensee. For example, two wireless devices may communicate on the licensed spectrum in an area outside of the coverage area of the primary licensee. This coverage area may be coarsely defined. For example, if weak signals are detected on a given frequency band in a particular cell, then that cell may be deemed to be outside the coverage area of the primary licensee, and wireless devices in this cell may use the frequency band.

Figure 3:
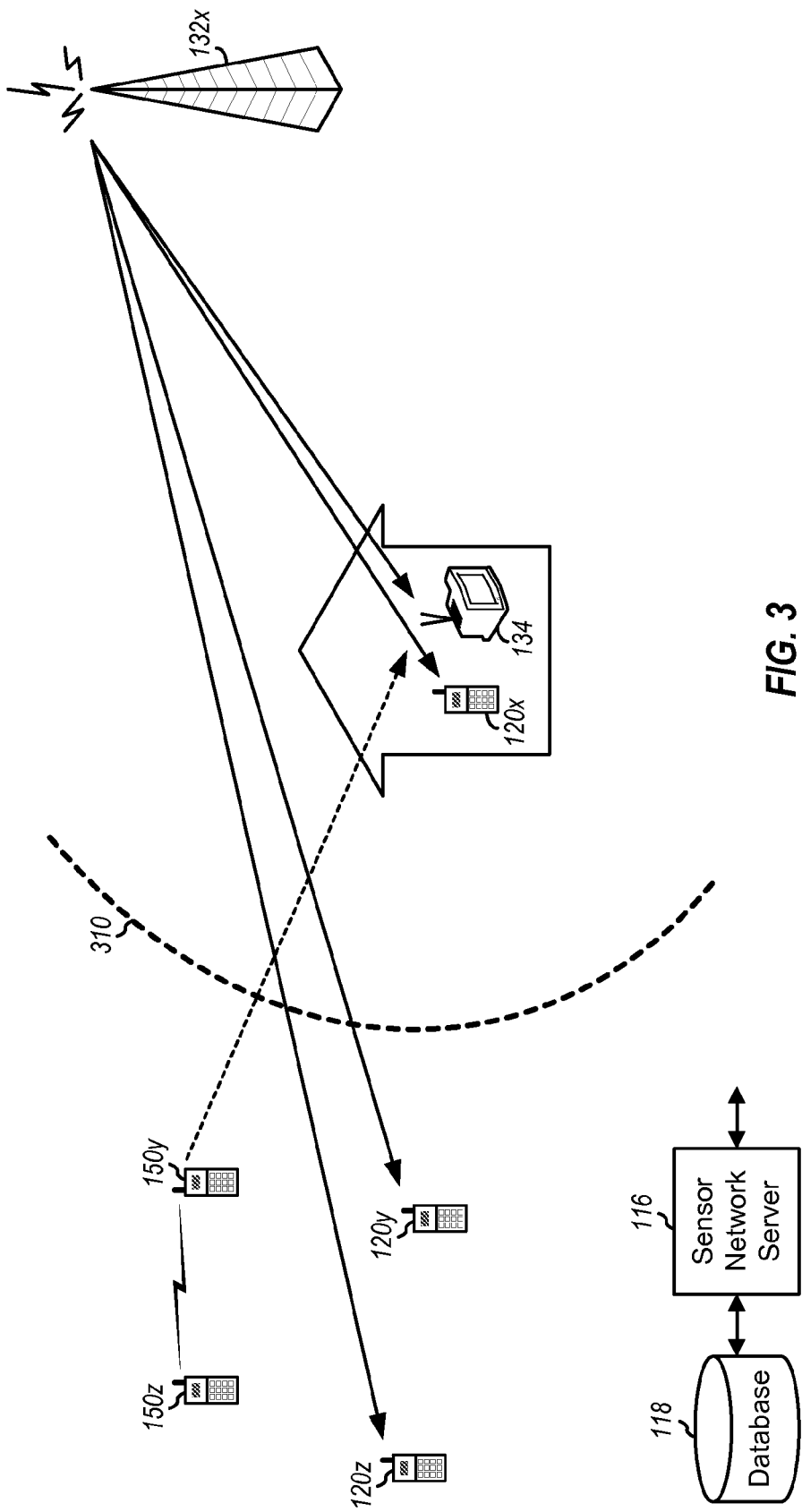
FIG. 3 shows spectrum usage measurements for cognitive radio.

FIG. 3 shows an example of spectrum usage measurements for cognitive radio. In this example, a broadcast station 132x broadcasts a signal on a frequency band granted to the primary licensee. The broadcast signal may be received by a broadcast (e.g., TV) receiver 134 and wireless devices 120x, 120y and/or 120z. Receiver 134 may be within the intended coverage of broadcast station 132x and may receive the broadcast signal with sufficiently strong signal strength. Wireless device 120x may be near the vicinity of receiver 134 and may measure the broadcast signal with sufficiently strong signal strength. Wireless devices 120y and 120z may be located farther away from broadcast station 132x and may obtain weak measurements for the broadcast signal. Wireless devices 120x, 120y and 120z may send their measurements to network sensor server 116, which may be server 116a in FIG. 1 or server 116b in FIG. 2.

Server 116 may obtain measurements from wireless devices 120x, 120y and 120z. Server 116 may determine that wireless device 120x is within the coverage of broadcast system 130 based on the strong received signal strength measurement from wireless device 120x. Server 116 may determine that wireless devices 120y and 120z are outside the coverage of broadcast system 130 based on the weak received signal strength measurements from wireless devices 120y and 120z. Based on such measurements over time and location from a large number of such wireless devices equipped with sensors for the broadcast system spectrum, server 116 may be able to develop a coverage map for broadcast system 130 and may identify the boundary (shown by a line 310 in FIG. 3) of the coverage provided by broadcast station 132x.

Wireless devices 150y and 150z may be capable of communicating as secondary users in the same frequency band as broadcast system 130. When wireless devices 150y and 150z wish to communicate on this frequency band, the location of these wireless devices may be used to determine whether their transmissions on the same frequency band would cause excessive interference at receiver 134 of the broadcast signal from broadcast station 132x. However, it may be difficult to accurately determine how much interference wireless devices 150y and 150z will cause to receiver 134 if wireless devices 150y and 150z operate on the frequency band used by broadcast station 132x. Depending on the distance between the locations of wireless devices 150y and 150z, with respect to the boundary of the coverage region of broadcast station 132x, a backoff factor or margin may be used to account for this uncertainty. In one design, wireless devices 150y and 150z may be allowed to operate on the frequency band if their location is sufficiently far away from the boundary of the coverage region of broadcast station 132x. In another design, the transmit power that wireless devices 150y and 150z may use may be dependent on the distance between wireless devices 150y and 150z to the boundary of the coverage region of broadcast station 132x, e.g., a higher transmit power may be used if wireless devices 150y and 150z are farther away from the boundary of the coverage region, and vice versa.

In general, wireless devices 120 may be capable of making measurements of signals in the broadcast system spectrum but may or may not be capable of communicating in this spectrum. Furthermore, wireless devices 150 may be capable of using the broadcast system spectrum but may or may not be capable of measuring signals in this spectrum or reporting sensor information back to the server.

Figure 4:
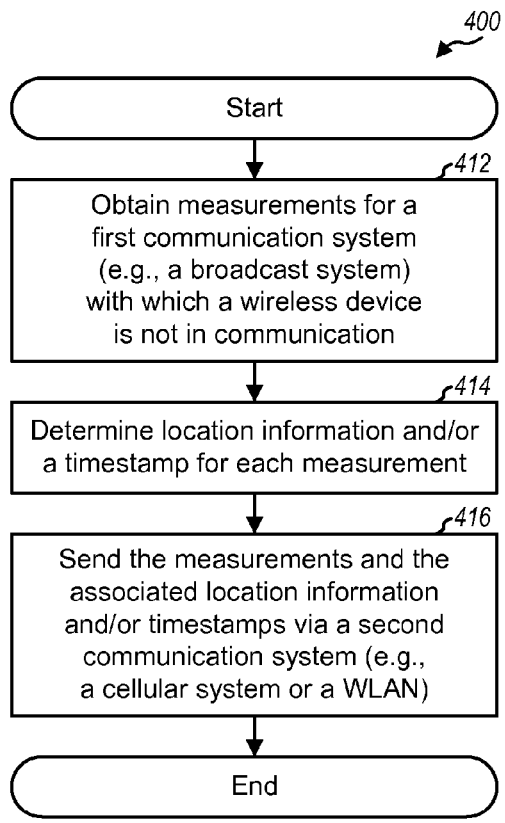
FIG. 4 shows a process for supporting cognitive radio by a wireless device.

FIG. 4 shows a design of a process 400 for supporting cognitive radio by a wireless device. Measurements for a first communication system (e.g., a broadcast system) with which the wireless device is not in communication may be obtained (block 412). Location information and/or a timestamp may also be determined for each measurement (block 414). The measurements and the associated location information and/or timestamps may be sent via a second communication system (e.g., a cellular system or a WLAN) (block 416). The measurements may comprise signal strength measurements for a frequency band used by the first system and not used by the second system. The measurements may be stored until communication is established with the second system and may be sent when communication is established.

Figure 5:
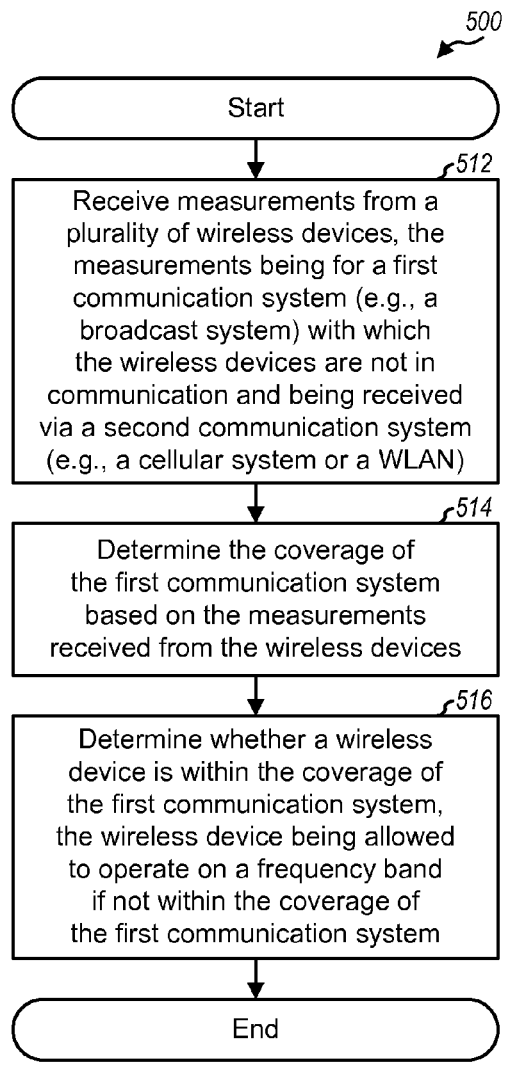
FIG. 5 shows a process for supporting cognitive radio by a server.

FIG. 5 shows a design of a process 500 for supporting cognitive radio by a sensor network server, e.g., server 116a in FIG. 1 or server 116b in FIG. 2. Measurements may be received from a plurality of wireless devices (block 512). The measurements are for a first communication system (e.g., a broadcast system) with which the wireless devices are not in communication and are received via a second communication system (e.g., a cellular system or a WLAN). The coverage of the first communication system may be determined based on the measurements received from the wireless devices (block 514). The measurements may comprise signal strength measurements for a frequency band used by the first communication system and not used by the second communication system. Location information and/or timestamps associated with the measurements may also be obtained from the wireless devices and used to determine the coverage of the first communication system. Whether a given wireless device is within the coverage of the first communication system may be determined (block 516). The wireless device may be allowed to operate on the frequency band if it is not within the coverage of the first communication system.

In general, wireless devices may be used in sensor networks for a variety of applications involving aggregation of information from a large number of wireless devices. The wireless devices may obtain measurements based on any of the following sensors:

Microphone—used for measuring sound and audio,
Camera—used for capturing images and videos,
Light sensor—used for detecting light,
RF sensor such as a radio receiver—used for making RF measurements,
Motion sensor or gyroscope—used for detecting motion and movement,
Radiation or pollutant sensor—used for detecting radiation or pollutant,
Thermometer and/or other weather sensor—used for detecting temperature and other weather characteristics, and
Positioning capability—used for determining position of the wireless device.

In general, a wireless device may include any number of sensors and any type of sensor. General-purpose sensors may be installed in wireless devices that are commercially available. Special-purpose sensors may be installed in wireless devices for special applications and/or regions. For example, radiation sensors may be installed in wireless devices operating near a nuclear plant, pollutant sensors may be installed in wireless devices operating in areas prone to pollution, pressure detectors may be installed in wireless devices operating near turbines, etc.

In general, any type of sensor information may be collected by a wireless device based on measurements from any type of sensor. The wireless device may also determine its location and timestamps for the measurements. Location may be determined based on GPS, Cell ID, and/or some other positioning methods. The wireless device may store the sensor information and the associated location and timestamps in a local database. The wireless device may upload the sensor information and the associated information at a convenient opportunity to the server.

The server may receive the sensor information and associated information from a number of wireless devices and may process and aggregate the sensor information. The server may construct detailed maps based on the aggregated sensor information, which may be collected over time and/or space by many wireless devices over a geographic region.

Different maps may be constructed based on the sensor information for different applications. For example, population density map and traffic prediction maps may be constructed based on reported locations of a large number of wireless devices. Traffic re-routing maps may be constructed with routes having lower than expected density of reported locations. Weather prediction map may be constructed based on information from thermometers and/or other weather sensors at the wireless devices. Radiation detection maps may be constructed based on information from radiation sensors at the wireless devices.

Figure 6:
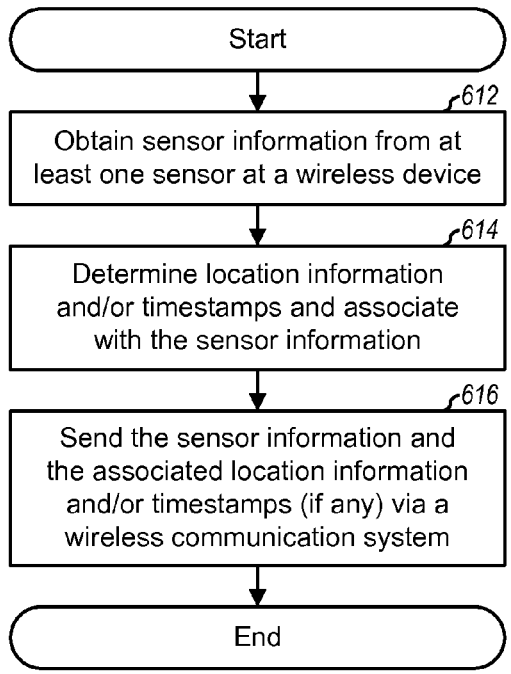
FIG. 6 shows a process performed by a wireless device for a sensor network.

FIG. 6 shows a design of a process 600 performed by a wireless device to support a sensor network. Sensor information may be obtained from at least one sensor at the wireless device (block 612). The at least one sensor may include any of the sensors listed above and/or other sensors. The sensor information may be obtained from measurements made by the sensor(s). For example, the sensor information may comprise a location estimate obtained based on measurements for satellites and/or base stations. The sensor information may also comprise sound, light, motion, radiation, etc., which may be obtained based on measurements for sound, light, motion, radiation, etc.

Location information for the wireless device when the censor information was obtained may be determined and associated with the sensor information (block 614). The location information may be determined based on (i) identification information for at least one fixed station from which pilot is received or (ii) pseudo-range measurements for satellites and/or timing measurements for base stations. Timestamps may also be determined and associated with the sensor information (also block 614). The sensor information may also comprise only the location information and timestamps, e.g., for traffic prediction.

The sensor information and the associated location information and/or timestamps (if any) may be sent via a wireless communication system (block 616). The sensor information may be stored until communication is established with the wireless communication system and may be sent when communication is established. The wireless communication system may be a cellular system, a WLAN, etc.

Figure 7:
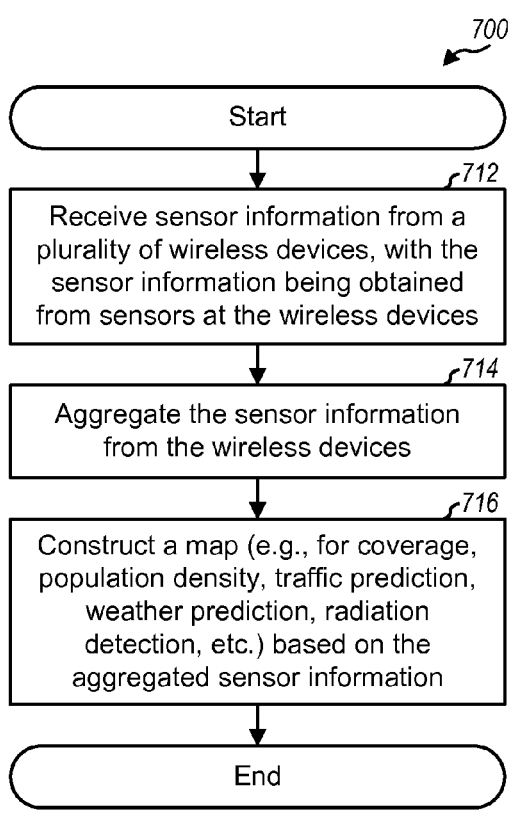
FIG. 7 shows a process performed by a server for a sensor network.

FIG. 7 shows a design of a process 700 performed by a server for a sensor network. Sensor information may be received from a plurality of wireless devices, with the sensor information being obtained from sensors at the wireless devices (block 712). The sensor information from the wireless devices may be aggregated (block 714). The aggregated sensor information may be used to construct a map, which may be a coverage map, a population density map, a traffic prediction map, a weather prediction map, a radiation detection map, etc. (block 716). Location information and/or timestamps associated with the sensor information may also be received from the wireless devices and used to construct the map.

In another aspect, a wireless device may obtain information from any of the sensors listed above and/or other sensors. The sensor information may be processed by the wireless device (or sent to the server and processed by the server) to construct a user profile or fingerprint for a user of the wireless device. In general, a user profile is a collection of data for a particular user. The user profile constructed from the sensor information may include any type of information for the user, depending on the types of sensor used to obtain the sensor information.

The user profile may include commute routes used by the user, which may be constructed based on the locations of the wireless device collected over time. The commute routes may be used in conjunction with traffic prediction and traffic re-routing maps to warn the user of potential traffic jams and/or to suggest alternate routes. The user profile may include an estimate of total exposure to radiation, which may be determined based on information collected from a radiation sensor. The user profile may include an estimate of exposure to sound and/or light pollution, which may be determined based on information collected from an audio sensor and/or a light sensor. The user profile may include a profile of physical activity and training, which may be determined based on information collected from a gyroscope, a motion sensor, a thermometer, etc. The user profile may also include other information derived from other types of sensors.

The user profile may include areas where Wi-Fi coverage may be likely. This Wi-Fi coverage information may be determined based on measurements of Wi-Fi signals collected over time at different locations. The Wi-Fi coverage information may be used along with the current location of the wireless device to enable power-efficient searches for Wi-Fi. For example, Wi-Fi searches may be performed only when a Wi-Fi hotspot can be discovered with high confidence based on the Wi-Fi coverage information and the current location, and may be avoided otherwise.

In general, each type of information in the user profile may be dependent on only location, or only time, or both location and time, or neither. Location information and/or timestamps may be obtained and associated with each type of information that is dependent on location and/or time, respectively.

In general, a location and timestamp fingerprint may be used to enable or disable certain capabilities of the wireless device and/or to control the operation of the wireless device. For example, a current measurement and the collected information in the user profile may be used to warn the user of excessive exposure to radiation, sun, sound, light, pollution, etc. The current location and/or timestamp and the collected information in the user profile may be used to automatically turn on certain features, e.g., to tune to traffic reporting during commuting times, news during the evening, etc. The current location and/or timestamp and the collected information may be used to enable or disable certain features such as Wi-Fi searches, etc.

Various user profile/fingerprint applications may be supported by equipping the wireless device with appropriate sensors. The user profile applications exploit the fact that the wireless device is associated with the user and frequently accompanies the user in different locations. These applications may collect and aggregate information from any type of sensor. These applications may also use the collected and aggregated information in various manners.

Figure 8:
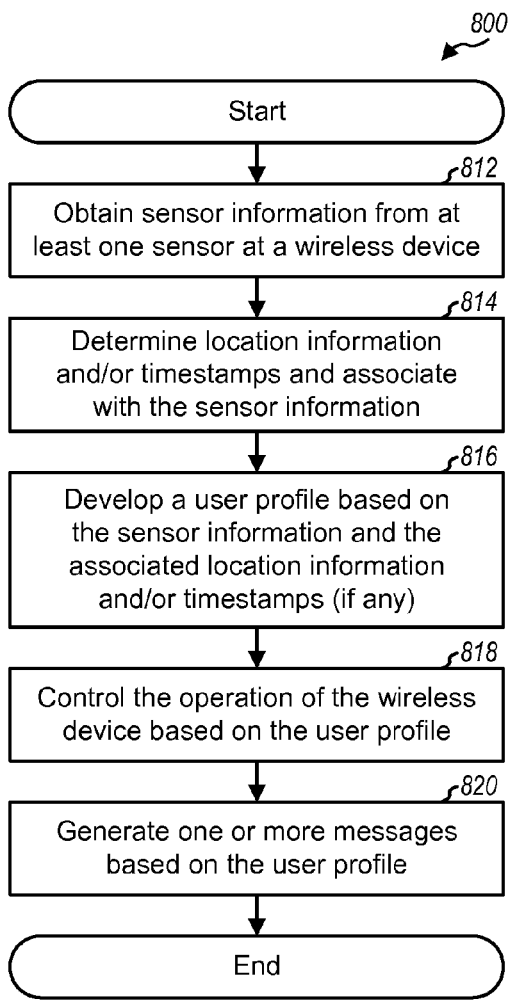
FIG. 8 shows a process performed by a wireless device for user fingerprint.

FIG. 8 shows a design of a process 800 performed by a wireless device for a user profile/fingerprint application. Sensor information may be obtained from at least one sensor at the wireless device (block 812). The at least one sensor may include any of the sensors listed above and/or other sensors. Location information and/or timestamps may also be determined and associated with the sensor information (block 814). A user profile may be developed based on the sensor information and the associated location information and/or timestamps, if any (block 816). The operation of the wireless device (e.g., Wi-Fi searches) may be controlled based on the user profile (block 818). One or more messages (e.g., warning messages) may also be generated based on the user profile (block 820).

Figure 9:
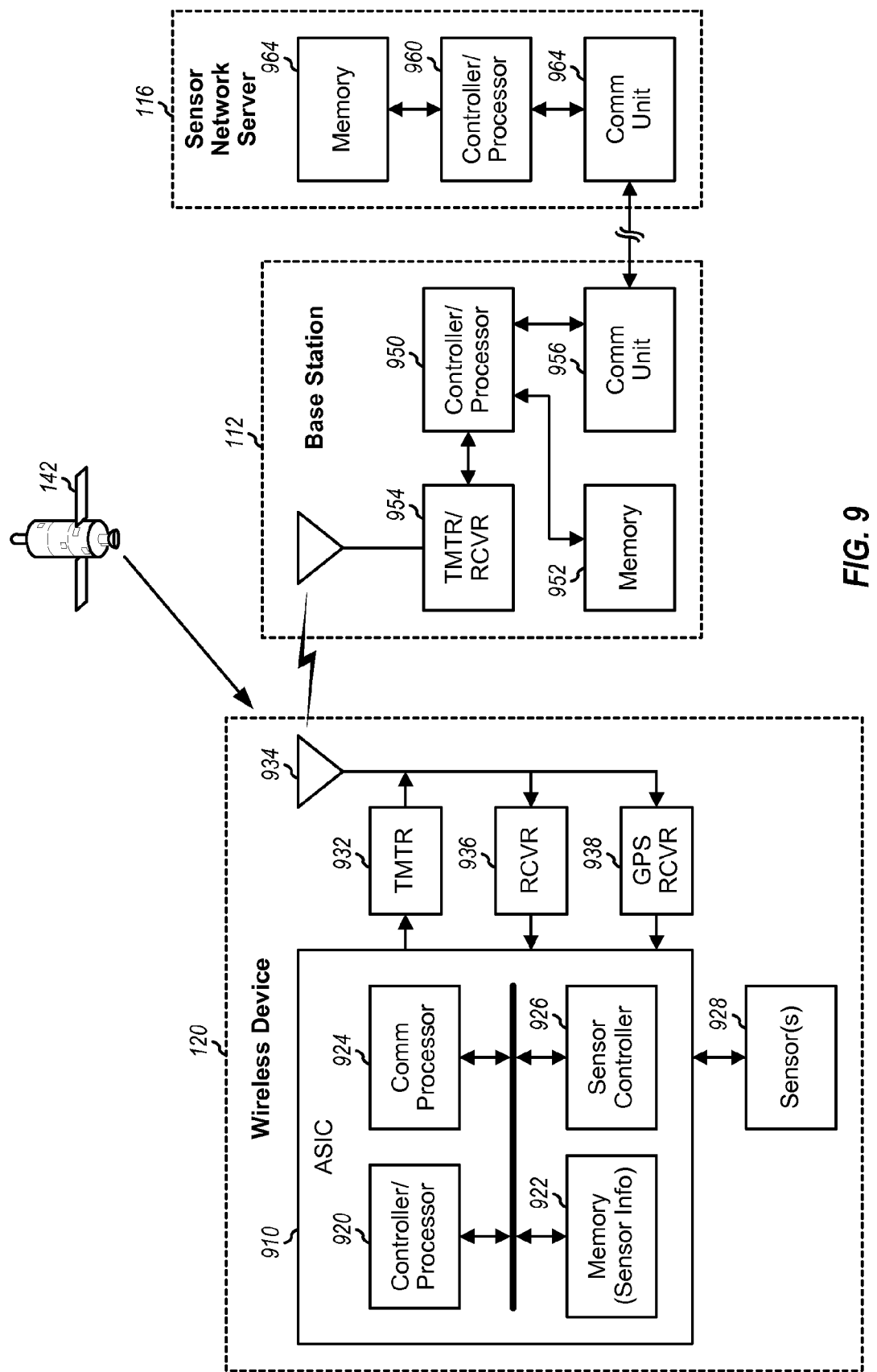
FIG. 9 shows a block diagram of a wireless device, a base station, and a sensor network server.

FIG. 9 shows a block diagram of a design of wireless device 120, which may be one of the wireless devices in FIG. 1 or 2. On the uplink, traffic data, signaling, and sensor information, measurements and associated information to be sent by wireless device 120 may be processed (e.g., encoded and modulated) by a communication (Comm) processor 924 to generate output chips. A transmitter (TMTR) 932 may condition (e.g., convert to analog, filter, amplify, and frequency upconvert) the output chips and generate an uplink signal, which may be transmitted via an antenna 934. On the downlink, antenna 934 may receive downlink signals from base station 112 and other base stations in a wireless network. A receiver (RCVR) 936 may condition (e.g., filter, amplify, frequency downconvert, and digitize) the received signal from antenna 934 and provide samples. Communication processor 924 may process (e.g., demodulate and decode) the samples and provide decoded data and signaling. Communication processor 924 may perform processing in accordance with a radio technology (e.g., CDMA 1X, W-CDMA, GSM, 802.11a b/n, etc.) utilized by the wireless network.

Receiver 936 may be used as an RF sensor to make measurements for other wireless systems (e.g., broadcast system 130) for cognitive radio and/or other sensor network applications. A GPS receiver 938 may provide measurements for satellites. These measurements may be processed to obtain accurate location estimates for wireless device 120. Coarse location estimates for wireless device 120 may also be determined based on pilots received from base station 120 and/or other base stations.

Sensor(s) 928 may include any of the sensors listed above and/or other sensors. Sensor(s) 928 may obtain measurements as directed by a sensor controller 926 and may provide the measurements to sensor controller 926 for processing. Sensor controller 926 may process the measurements to obtain sensor information. Sensor controller 926 may also construct a user profile based on the sensor information and may control certain operation of wireless device 120 based on the user profile and/or other information.

A controller/processor 920 may direct the operation at wireless device 120. Controller/processor 920 and/or sensor controller 926 may perform process 400 in FIG. 4, process 600 in FIG. 6, process 800 in FIG. 8, and/or other processes for the techniques described herein. A memory 922 may store program codes and data for wireless device 120. Memory 922 may also store sensor information, measurements and associated information, e.g., until the stored information can be sent to a network sensor server via the wireless network. Memory 922 may also store the user profile constructed based on the sensor information and/or measurements.

FIG. 9 also shows a design of base station 112, which may be one of the base stations in FIG. 1 or 2. Base station 112 includes a controller/processor 1150 that performs various functions for communication with the wireless devices, a memory 952 that stores program codes and data for base station 112, a transmitter/receiver 954 that supports radio communication with the wireless devices, and a communication unit 956 that supports communication with other network entities.

FIG. 9 also shows a design of server 116, which may be server 116a in FIG. 1 or server 116b in FIG. 2. Server 116 includes a controller/processor 960 that performs various functions for a sensor network, a memory 962 that stores program codes and data for server 116, and a communication unit 964 that supports communication with other network entities. Controller/processor 960 may receive sensor information, measurements and associated information from wireless devices, process the measurements, aggregate the sensor information, and construct maps. Controller/processor 960 may perform process 500 in FIG. 5, process 700 in FIG. 7, and/or other processes for the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
at least one processor configured to obtain measurements of a signal strength of each frequency band transmitted by a first communication system with which a wireless device is not in communication, wherein each frequency band comprises a broadcast television band, wherein the at least one processor is configured to determine location information and a timestamp for each of the measurements and to associate the location information and the timestamp with a particular measurement of signal strength, wherein the first communication system comprises a broadcast television system, to store the measurements until a voice call or a data connection is established for a reason other than to send the measurements, to send the measurements of the signal strength in the broadcast television system and associated location information and timestamps via a second communication system, and to obtain information regarding whether the apparatus is within a coverage area of a particular frequency band, wherein the measurements of the signal strength are for at least one frequency band that is not used by the second communication system, and wherein the second communication system is a cellular system; and
a memory coupled to the at least one processor.

2. A method comprising:
obtaining measurements of a signal strength of each frequency band transmitted by a first communication system with which a wireless device is not in communication, wherein the first communication system comprises a broadcast television system, wherein each frequency band comprises a broadcast television band;
determining location information and a timestamp for each of the measurements;
associating the location information and the timestamp with a particular measurement of signal strength;
storing the measurements until a voice call or a data connection is established for a reason other than to send the measurements;
sending the measurements of the signal strength in the broadcast television system and associated location information and timestamps via a second communication system, wherein the measurements of the signal strength are for at least one frequency band that is not used by the second communication system, and wherein the second communication system is a cellular system; and
obtaining information regarding whether the wireless device is within a coverage area of a particular frequency band.

3. An apparatus comprising:
means for obtaining measurements of a signal strength of each frequency band transmitted by a first communication system with which a wireless device is not in communication, wherein the first communication system comprises a broadcast television system, wherein each frequency band comprises a broadcast television band;
means for determining location information and a timestamp for each of the measurements;
means for associating the location information and the timestamp with a particular measurement of signal strength;
means for storing the measurements until a voice call or a data connection is established for a reason other than to send the measurements;
means for sending the measurements of the signal strength in the broadcast television system and associated location information and timestamps via a second communication system, wherein the measurements of the signal strength are for at least one frequency band that is not used by the second communication system, and wherein the second communication system is a cellular system; and
means for obtaining information regarding whether the apparatus is within a coverage area of a particular frequency band.

4. A non-transitory computer-readable medium comprising instructions for obtaining measurements, the instructions being executable to:
obtain measurements of a signal strength of each frequency band transmitted by a first communication system with which a wireless device is not in communication, wherein the first communication system comprises a broadcast television system, wherein each frequency band comprises a broadcast television band;
determine location information and a timestamp for each of the measurements;
associate the location information and the timestamp with a particular measurement of signal strength;
store the measurements until a voice call or a data connection is established for a reason other than to send the measurements;
send the measurements of the signal strength in the broadcast television system and associated location information and timestamps via a second communication system, wherein the measurements of the signal strength are for at least one frequency band that is not used by the second communication system, and wherein the second communication system is a cellular system; and
obtain information regarding whether the wireless device is within a coverage area of a particular frequency band.

* * * * *